United States Patent
Kang (10) Patent No.: US 6,981,568 B2
(45) Date of Patent: Jan. 3, 2006

(54) VEHICLE SPEED RESPONSE TYPE POWER STEERING SYSTEM

(75) Inventor: Do-Gab Kang, Gyeongsangnam-do (KR)

(73) Assignee: Kia Motors Corporation, Seoul (KR)

( * ) Notice: Subject to any disclaimer, the term of this patent is extended or adjusted under 35 U.S.C. 154(b) by 80 days.

(21) Appl. No.: 10/702,182

(22) Filed: Nov. 4, 2003

(65) Prior Publication Data

US 2004/0089497 A1 May 13, 2004

(30) Foreign Application Priority Data

Nov. 4, 2002 (KR) ................ 10-2002-0067830

(51) Int. Cl.
*B62D 6/02* (2006.01)

(52) U.S. Cl. ..................................... 180/423; 180/403
(58) Field of Classification Search ................ 180/403, 180/417, 421–423
See application file for complete search history.

(56) References Cited

U.S. PATENT DOCUMENTS

| 4,759,420 A | * | 7/1988 | Schipper et al. | ............ 180/423 |
| 4,858,712 A | * | 8/1989 | Neff | ............ 180/423 |
| 5,046,573 A | * | 9/1991 | Jones | ............ 180/423 |
| 5,046,574 A | * | 9/1991 | Goodrich et al. | ............ 180/423 |
| 5,058,696 A | * | 10/1991 | Prebay et al. | ............ 180/429 |
| 5,070,958 A | * | 12/1991 | Goodrich et al. | ............ 180/423 |

FOREIGN PATENT DOCUMENTS

JP          04-262970          9/1992

* cited by examiner

*Primary Examiner*—Lesley D. Morris
*Assistant Examiner*—Matthew Luby
(74) *Attorney, Agent, or Firm*—Morgan Lewis & Bockius LLP (57) ABSTRACT

A vehicle speed response type power steering system, wherein, when a vehicle is moving at a relatively slow speed, a relatively large auxiliary power is generated to enable a driver to easily adjust a steering of the vehicle with relatively little steering power, and when a vehicle is moving at a high speed, a relatively small auxiliary power is generated to prevent an abrupt turn in order to stabilize the steering operation of the vehicle, such that formation of appropriate auxiliary power in response to a vehicle speed allows a driver to carry out an easy and safe steering manipulation.

5 Claims, 8 Drawing Sheets

VEHICLE SPEED RESPONSE TYPE POWER STEERING SYSTEM

CROSS-REFERENCE TO RELATED APPLICATIONS

This application claims priority of Korean Application No. 10-2002-0067830, filed on Nov. 4, 2002, the disclosure of which is incorporated fully herein by reference.

FIELD OF THE INVENTION

The present invention relates to a power steering system of a vehicle and, more particularly, to a vehicle speed response type power steering system employing hydraulic pressure to change the steering power in response to a vehicle speed.

BACKGROUND OF THE INVENTION

A power steering apparatus of a vehicle assists a driver in executing a steering operation. It is important that when a vehicle is moving at a slow speed, a relatively large auxiliary power is generated so that a driver can easily steer the vehicle with relatively little force, and when a vehicle is moving at a high speed, a relatively small auxiliary power is generated so that an abrupt turn is prevented, thereby stabilizing the steering operation of the vehicle.

SUMMARY OF THE INVENTION

Embodiments of the present invention provide a vehicle speed response type power steering system in which a relatively large auxiliary power is generated when a vehicle moves at a relatively slow speed to enable a driver to more easily steer the vehicle, and a relatively small auxiliary power is generated when a vehicle is moving at a high speed to prevent an abrupt turn in order to stabilize the steering operation of the vehicle. Thus, appropriate auxiliary power in response to vehicle speed allows the driver to carry out easy and safe steering manipulation.

In accordance with a preferred embodiment of the present invention, a vehicle speed response type power steering system comprises connecting means, disposed between a valve sleeve and a valve spool of a control valve, for changing the rotational force to rotate said valve spool in relation to said valve sleeve in response to pressure provided to the connecting means. A solenoid valve controls the flow rate of oil provided from a power steering pump to supply the oil to said connecting means. A controller controls the solenoid valve in response to the vehicle speed A cut-off valve controls the flow rate of oil returned to an oil reservoir in response to pressure change of oil provided to said connecting means.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE PREFERRED EMBODIMENTS

The preferred embodiment of the present invention will now be described in detail with reference to the accompanying drawings.

Figure 1:
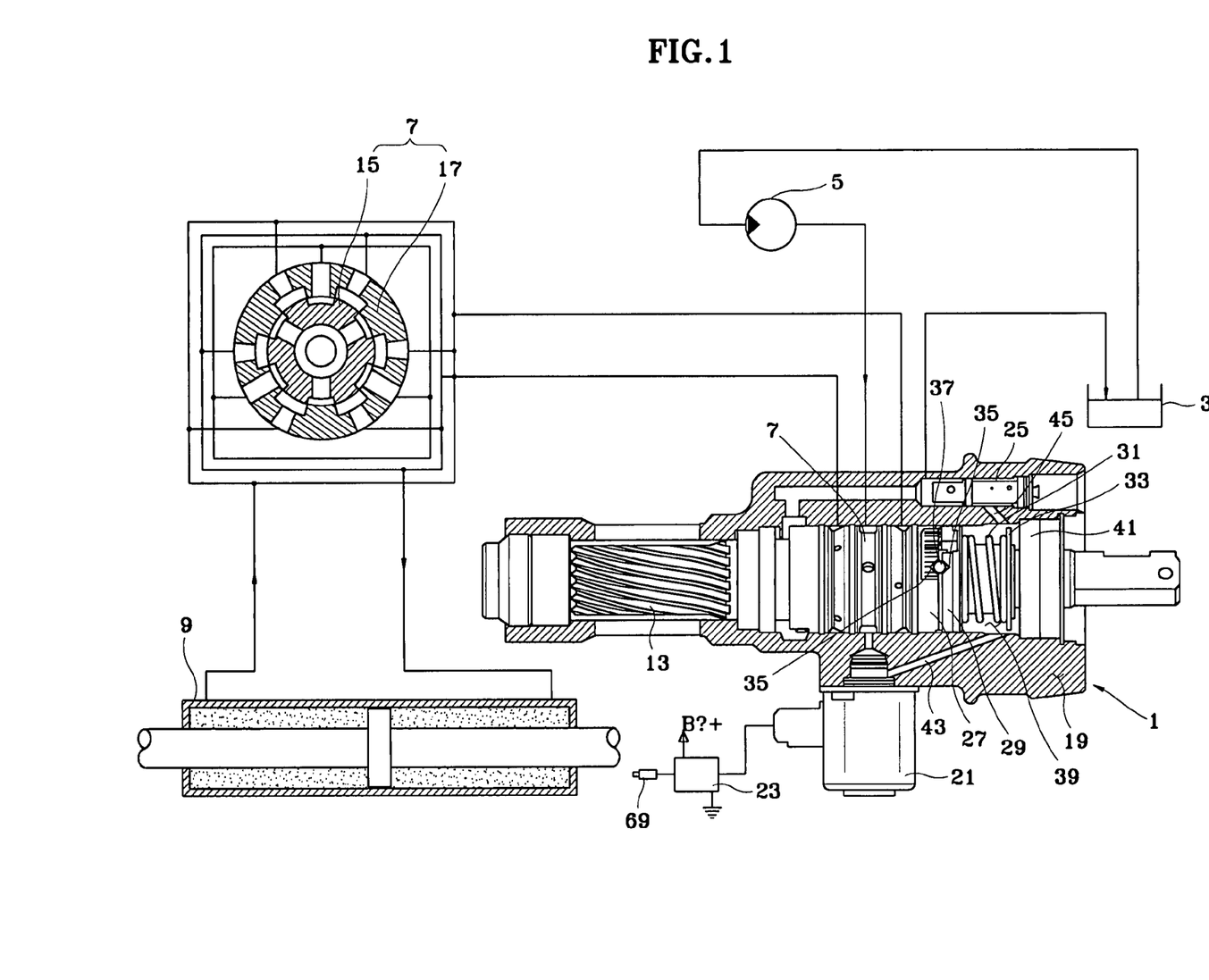
FIG. 1 is a schematic drawing of a power steering gear in a vehicle speed response type power steering system according to an embodiment of the present invention.

An embodiment of a vehicle speed response type power steering system according to the present invention as illustrated in FIG. 1 includes a power steering gear 1 for receiving steering power from the steering wheel to linearly move a rack (not shown) and to move a tie rod connected to the rack for carrying out the steering. A power steering pump 5 pumps fluid from a fluid reservoir 3 to provide same to the power steering gear 1. A power cylinder 9 assists linear movement of the rack in response to fluid pressure provided by activation of a control valve 7 at the power steering gear 1.

The power steering gear 1 includes a torsion bar 11 for receiving, at one distal end thereof, rotational force from the steering wheel. A pinion 13 is rotatably connected at the other end of the torsion bar 11 to linearly move the rack. A control valve 7 disposed with a valve spool 15 is integrally connected to one end of the torsion bar 11. A valve sleeve 17 is preferably integrally connected with the pinion 13, and a gear body 19 is equipped with a fluid path for communicating with the control valve 7 and rotatably supporting the control valve 7 and the pinion 13.

Figure 2:
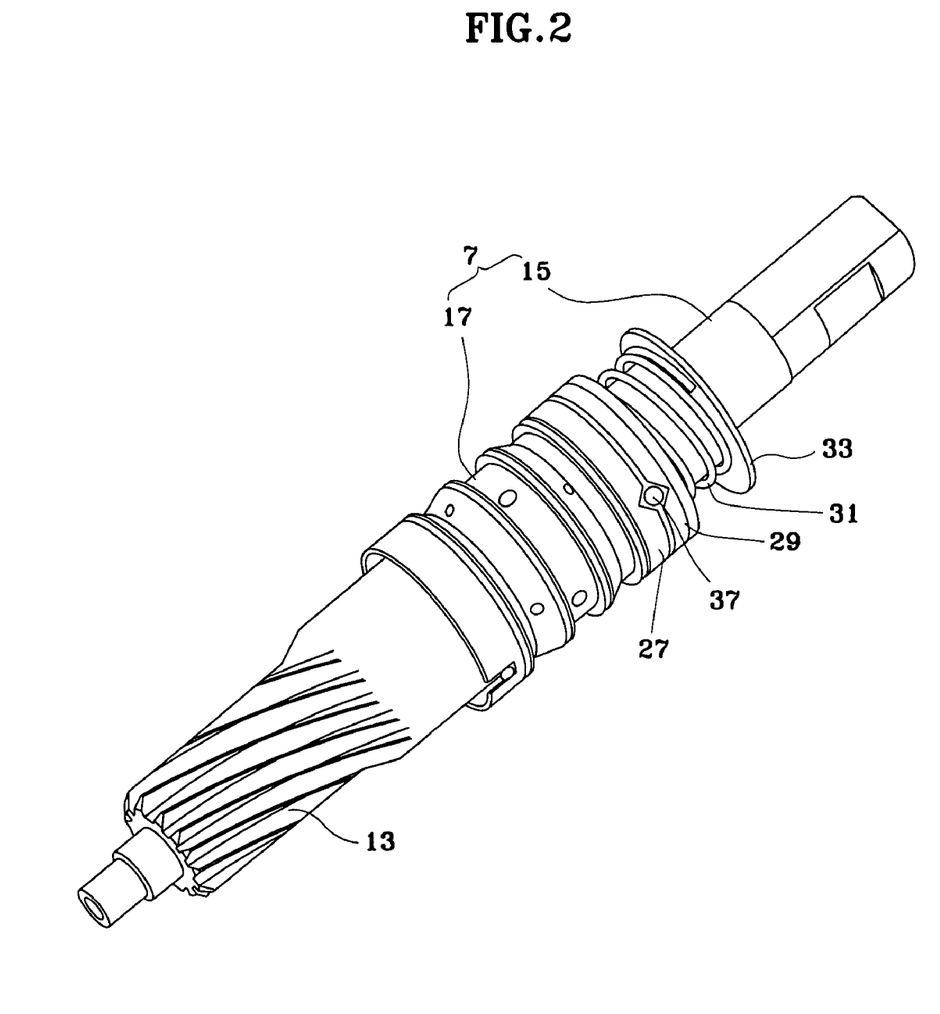
FIG. 2 is a schematic drawing illustrating a pinion, a control valve and connecting means in FIG. 1.
Figure 3:
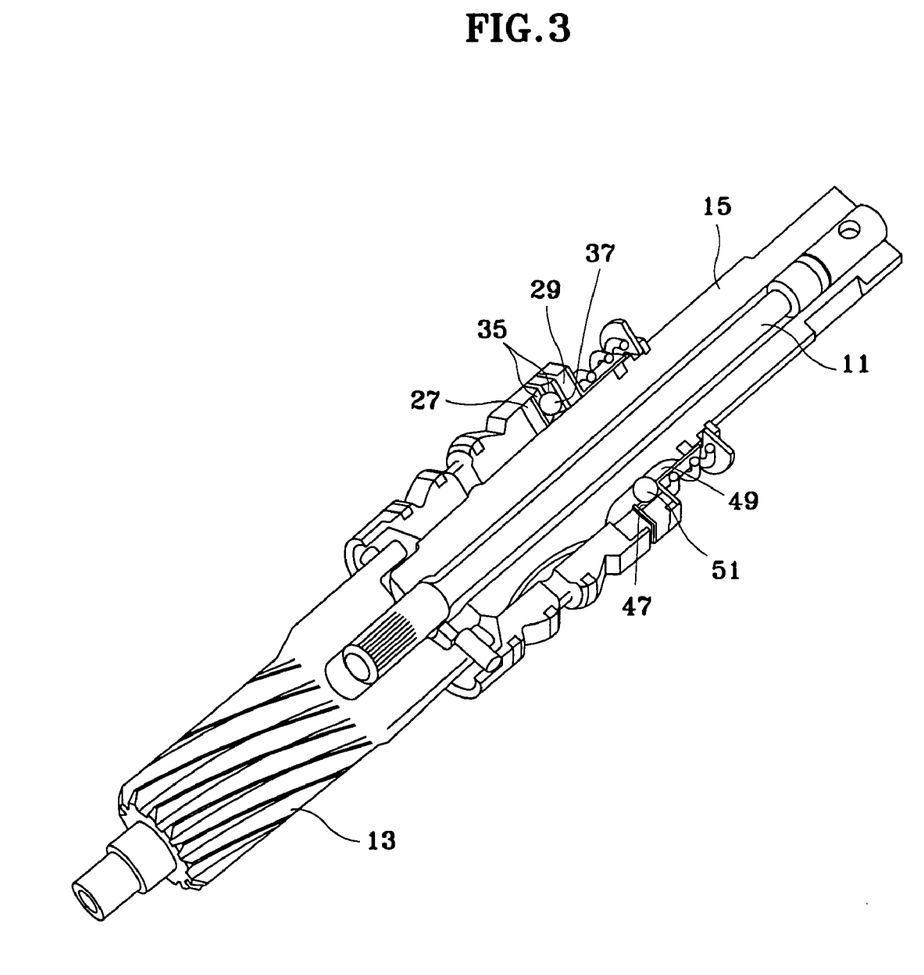
FIG. 3 is a cross-sectional view of FIG. 2.
Figure 4:
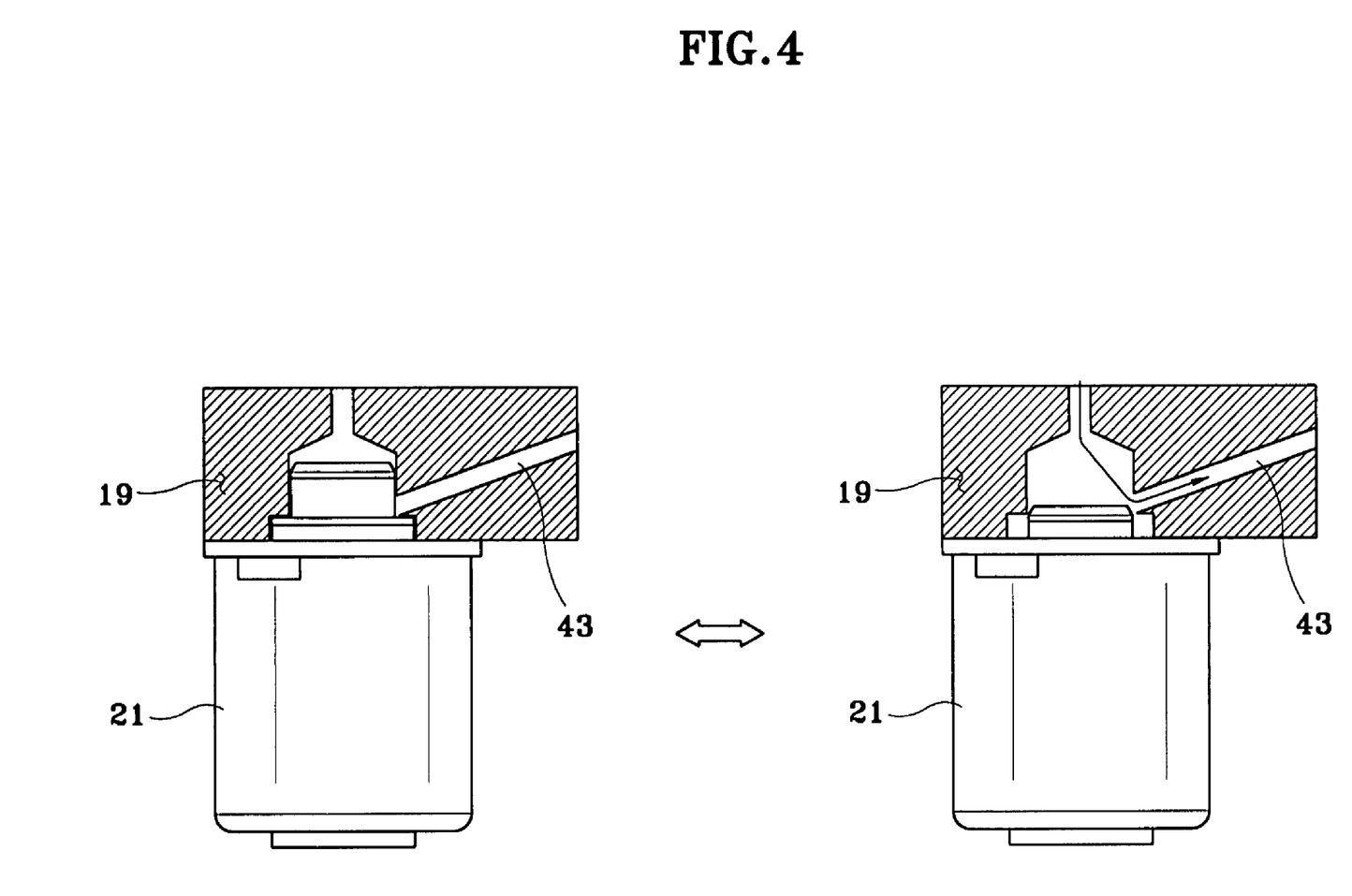
FIG. 4 is a schematic drawing illustrating an operating state of a solenoid valve.

As further illustrated in FIGS. 2 and 3, the power steering gear 1 is comprises a connecting means, disposed between a valve sleeve 17 and a valve spool 15 of a control valve 7, for changing the rotational force for rotating the valve spool 15 relative to the valve sleeve 17 in response pressure provided to the connecting means. A solenoid valve 21 controls the flow rate of oil provided from power steering pump 5 to supply same to the connecting means. A controller 23 (FIG. 1) controls the solenoid valve 21 in response to vehicle speed. A cut-off valve 25 controls the flow rate of oil returned to a fluid reservoir 3 in response to oil pressure change provided to the connecting means.

The connecting means preferably comprises a plurality of rings and control components. An extension ring 27 connects to the valve sleeve 17. A reaction ring 29 is installed at a periphery of the valve spool 15 to limit rotation relative to the valve spool 15 and to enable axial linear movement relative to the valve spool 15. A spring 31 and a spring seat 33 are disposed to press the reaction ring 29 to a lateral surface of the extension ring 27. Two control grooves 35 are formed to face each other in between the extension ring 27 and the reaction ring 29 for controlling the relative rotation of the reaction ring 29 against the extension ring 27. A control ball 37 is inserted into the control groove 35. A valve cap 41 faces the reaction ring 29 with a reaction chamber 39 formed between the valve cap 41 and the reaction ring 29 while the spring 31 and the spring seat 33 are formed in the reaction chamber 39 which forms pressure to be applied to the reaction ring 29.

In other words, the reaction chamber 39 is a void formed by the gear body 19, the reaction ring 29 and the valve cap 41 in which the spring 31 and the spring seat are situated, and to which a discharge path 45 is connected for communicating with a supply path 43 supplied with fluid provided from the solenoid valve 21 and the cut-off valve 25. The spring seat 33 is a round plate inserted into a periphery of the valve spool 15 as shown in FIG. 3.

With regard to the connection between the reaction ring 29 and the valve spool 15, the reaction ring 29 is restricted in its relative rotation against the valve spool 15 by a hitching groove 47, a fixed groove 49 and a fixed ball 51. The hitching groove 47 is formed axially along valve spool 15 at an inner circumferential surface of the reaction ring 29. The fixed groove 49 is formed in an axial direction at an outer circumferential surface of the valve spool 15 to cooperate with hitching groove 47. The fixed ball 51 is inserted between the hitching groove 47 and the fixed groove 49, such that it is possible to perform an axial linear movement against the valve spool 15.

The cut-off valve 25 (FIGS. 1 and 5) includes a cut-off body 59 equipped with a small-diameter inlet 53 formed to communicate with the reaction chamber 39. A large-diameter inlet 55 and an outlet 57 are formed to communicate with the fluid reservoir 3. A cut-off spool 61 and cut-off spring 63 switch communication of small-diameter inlet 53 with outlet 57 to communication of large-diameter inlet 55 with outlet 57 as the pressure applied to the large-diameter inlet 55 is increased.

Figure 5:
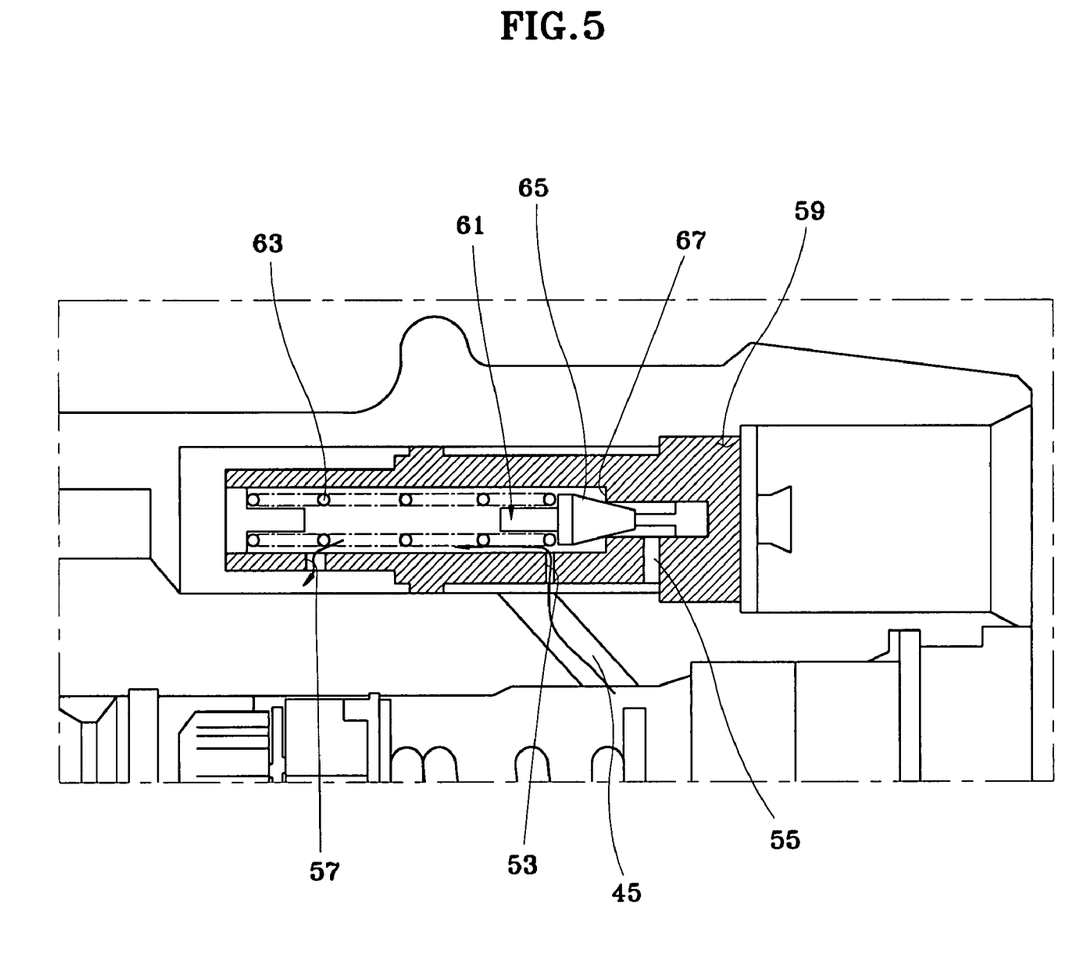
FIG. 5 is a schematic drawing illustrating fluid in a reaction chamber drained through a small-diameter inlet of a cut-off valve.
Figure 6:
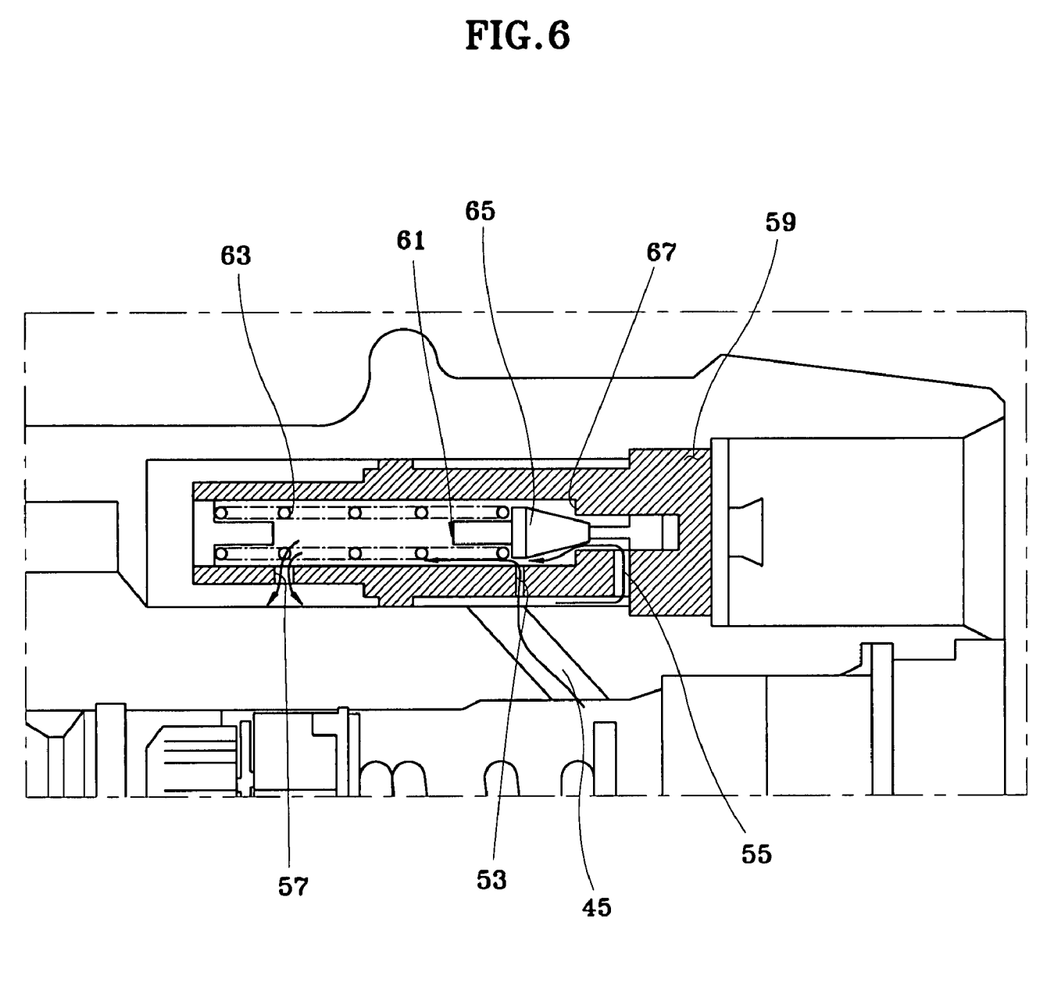
FIG. 6 is a schematic drawing illustrating fluid in a reaction chamber drained through a large-diameter inlet of a cut-off valve.

The outlet 57, the small-diameter inlet 53 and the large-diameter inlet 55 are preferably formed in a single file in the cut-off body 59. The cut-off spool 61 is equipped with a conical land 65 having a maximum diameter for communication between small-diameter inlet 53 and outlet 57 at all times and formed with the maximum diameter tapering off from the small-diameter inlet 53 to the large-diameter inlet 55. A void between the small-diameter inlet 53 of the cut-off body 59 and the large-diameter inlet 55 is disposed with an adjusting distal end 67 for adjusting communication between the small-diameter inlet 53 and the large-diameter inlet 55 as the conical land 65 is moved. The cut-off spring 63 is so installed as to exercise a resilience pushing the conical land 65 to the adjusting distal end 67.

Figure 7:
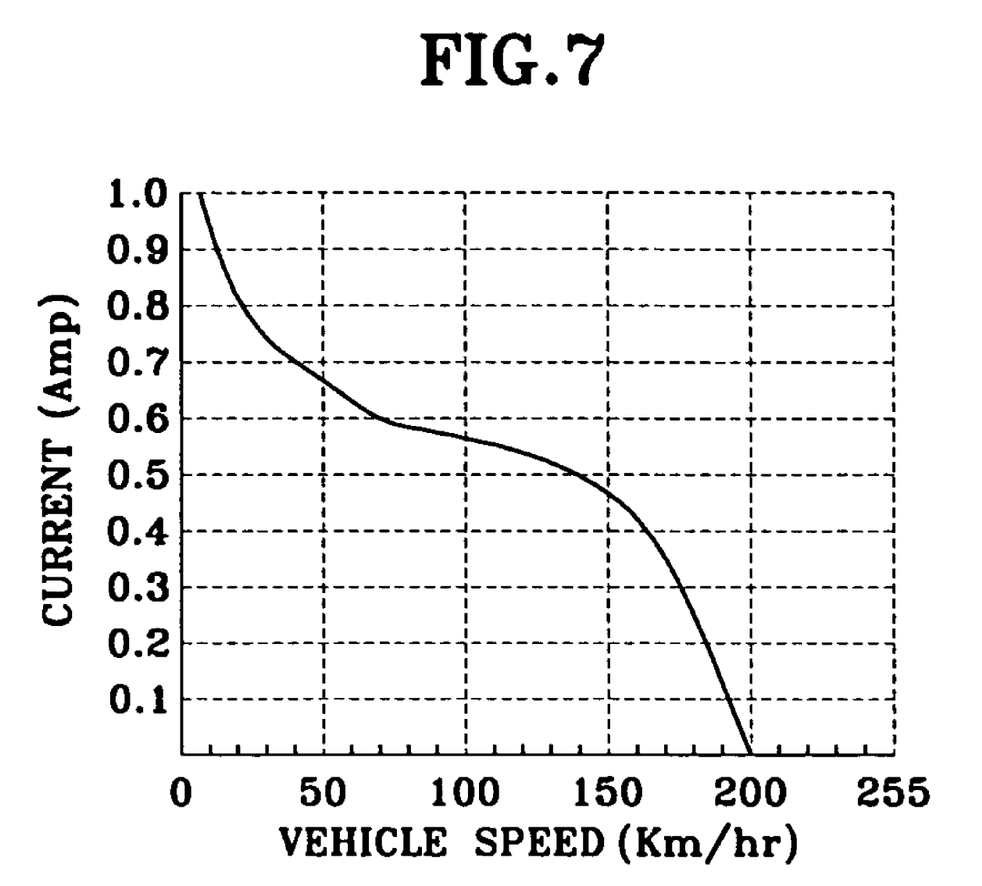
FIG. 7 is a graph illustrating a current value provided from a controller to a solenoid valve.

Controller 23, which is an electronic control unit, continuously receives a current vehicle speed from a vehicle speed sensor 69, where the current value to be provided to the solenoid valve 21 in response to a signal of the input vehicle speed is illustrated in FIG. 7. Controller 23 preferably comprises a processor, memory and associated hardware and software as may be selected and programmed by a person of ordinary skill in the art based on the teaching provided herein.

As shown in FIG. 7, the solenoid valve 21 is supplied with 1 ampere current when a vehicle is not in motion, and as the vehicle speed increases, a smaller current than 1 ampere is supplied such that the flow rate of oil supplied to the reaction chamber 39 is gradually increased from zero.

The operation of the present invention thus constructed will now be described in detail in the following manner.

The solenoid valve 21 does not send fluid supplied from the power steering pump 5 to the reaction chamber 39. As a result, the reaction chamber 39 is not formed with fluid pressure, and under this state, as in the general hydraulic power steering system, when the steering power of a driver is supplied to a distal end of the torsion bar 11, the torsion bar 11 is twisted to give rise to a relative rotation of the valve spool against the valve sleeve 17, in which fluid supplied from the power steering pump 5 is sent to the power cylinder 9, thereby generating auxiliary power to assist the driver in steering the vehicle.

When relative rotation of the valve spool 15 against the valve sleeve 17 is generated, the control ball 37 is pulled out from a control groove 35 of the reaction ring 29 installed for limiting the rotation of the valve spool 15. In order for the control ball 37 to be pulled out from the control groove 35 of the reaction ring 29, the reaction ring 29 presses the spring 31 to move in the axial direction of the valve spool 15, such that the force for limiting relative rotation of the valve spool 15 against the valve spool 17 is a sum of a force of the control ball 37 trying to escape from the control groove 35 while the reaction ring 29 presses the spring 31 and a torsional resilient force of the torsion bar 11.

Of course, this force can be overcome by the steering force. The force that is generated when a vehicle is not in motion is established to be very weakly formed. As a result, even if a driver provides a weak steering force, relative rotation of the valve spool 15 against the valve sleeve 17 can be easily realized, such that needed auxiliary power can be easily generated.

As illustrated in FIG. 7, the controller 23 provides a current smaller than 1 ampere to the solenoid 21 when a vehicle is moving at a slow speed. It should be noted that this current is larger than the current at a high speed relatively compared therewith. As a result, at relatively low speeds, the solenoid valve 21 can supply oil to the reaction chamber 39 in a larger quantity than when in the stopped state, but in smaller quantities than when in the high speed state.

The fluid supplied to the reaction chamber 39 forms a hydraulic pressure inside the reaction chamber 39, which in turn is controlled by the cut-off valve 25 connected to the discharge path 45. The cut-off valve 25 allows inflow of the fluid via the small-diameter inlet 53 under a prescribed pressure (e.g., 5 bar), thereby enabling the fluid to return to the fluid reservoir 3 via the outlet 57, and when the fluid exceeds a prescribed pressure, the cut-off spool 61 compressively moves the cut-off spring 63 to also allow inflow of the fluid in the reaction chamber 39 via the large-diameter inlet 55, thereby enabling the fluid to return to the fluid reservoir 3 via the outlet 57.

When the steering power is supplied to a distal end of the torsion bar 11, while the fluid pressure is formed inside the reaction chamber 39, the valve spool 15 connected to the distal end of the torsion bar 11 is relatively rotated against the valve sleeve 17 integrally connected to the pinion 13, such that the power cylinder 9 can be activated by the fluid pressure provided from the power steering pump 5.

Under this state, in order for the valve spool 15 to relatively rotate against the valve sleeve 17, the control ball 37 is pulled out from the control groove 35 of the reaction ring 29 so equipped as to restrict the rotation relative to the valve spool 15.

In order for the control ball 37 to be pulled out from the control groove 35 of the reaction ring 29, the reaction ring 29 should overcome the fluid pressure of the reaction chamber 39 to compress the spring 31 and to move in the axial direction of the valve spool 15.

Under this state, the force for restricting the relative rotation of the valve spool 15 against the valve sleeve 17 is a sum of a fluid pressure of the reaction chamber 39, a force of the control ball 37 trying to escape from the control groove 35 while the reaction ring 29 presses the spring 31 and a torsional resilient force of the torsion bar 11.

In other words, the valve spool 15 can relatively rotate against the valve sleeve 17 to generate auxiliary power by way of the power cylinder 9 when a force strong enough to overcome the fluid pressure formed inside the reaction chamber 39 should be further provided to the steering power of a driver, compared with a vehicle not in motion. As a result, a desired steering can be exercised by turning of a steering wheel with relatively more power than when a vehicle is stopped.

When a vehicle is moving at a high speed as shown in FIG. 7, the solenoid 21 is receives a current smaller than when the vehicle is moving at a slow speed. As a result, the solenoid 21 further increases the amount of fluid supplied from the power steering pump 5 to the reaction chamber 39. The reaction chamber 39 is formed with a relatively greater fluid pressure than when a vehicle is moving at a low speed, and the fluid pressure thus formed is controlled by the cut-off valve 25.

When the steering power of a driver is supplied to the distal end of the torsion bar 11 due to fluid pressure formed inside the reaction chamber 39, the valve spool 15 connected to the distal end of the torsion bar 11 is relatively rotated in respect of the valve sleeve 17 connected to the pinion 13, such that the fluid pressure supplied from the power steering pump 5 causes the power cylinder 9 to actuate.

Under this state, when the valve spool 15 is relatively rotated against the valve sleeve 17, the control ball 37 is pulled out of the control groove 35 of the reaction ring 29 so disposed as to restrict the rotation relative to the valve spool 15. When the control ball 37 is pulled out of the control groove 35 of the reaction ring 29, the reaction ring 29 resists the fluid pressure of the reaction chamber 39 and compresses the spring 31 in the axial direction of the valve spool 15. Under this state, the force for restricting the relative rotation of the valve spool 15 against the valve sleeve 17 is a sum of a fluid pressure of the reaction chamber 39, a force of the control ball 37 trying to escape from the control groove 35 while the reaction ring 29 compresses the spring 31 and a torsional resilient force of the torsion bar 11.

The compression force of the spring 31 and torsional resilient force of the torsion bar 11 during slow speed are the same as those of a non-moving vehicle, and hydraulic pressure of the reaction chamber 39 is relatively large, such that a driver may manipulate the steering wheel with a larger force to generate an auxiliary power of the power cylinder 9. In other words, the controller 23 controls the solenoid valve 21 in relation to vehicle speed and the solenoid valve 21 controls the fluid quantity provided to the reaction chamber 39. The hydraulic pressure formed at the reaction chamber 39 changes the rotational force for enabling relative rotation of the valve spool 15 against the valve sleeve 17, thereby enabling to form an auxiliary power of the power cylinder 9 for assisting the steering power of the driver in relation to the vehicle speed.

The operation of the cut-off valve 25 controlling the hydraulic pressure of the reaction chamber 39 will now be described.

Under a prescribed hydraulic pressure, e.g., 5 bar, a predetermined quantity of fluid supplied via the solenoid valve 21 maintains a state of return to the fluid reservoir 3 through the small-diameter inlet 53 and the outlet 57. When the vehicle stops and oil is not supplied to the solenoid valve 21, the hydraulic pressure of the reaction chamber 39 is released. When the hydraulic pressure exceeds a prescribed level, fluid of the reaction chamber 39 is quickly returned even through the large-diameter inlet 55 to the fluid reservoir 3 via the outlet 57, thereby allowing no excessively large fluid pressure to form in the reaction chamber 39.

As a result, even when the solenoid valve 21 is fully opened to allow a maximum amount of fluid to be supplied to the reaction chamber 39 (when a vehicle is moving at a very high speed, or when the solenoid valve 21 is out of order), the reaction ring 29 is able to compress the spring 31 and be moved, thereby enabling to realize the power steering.

Figure 8:
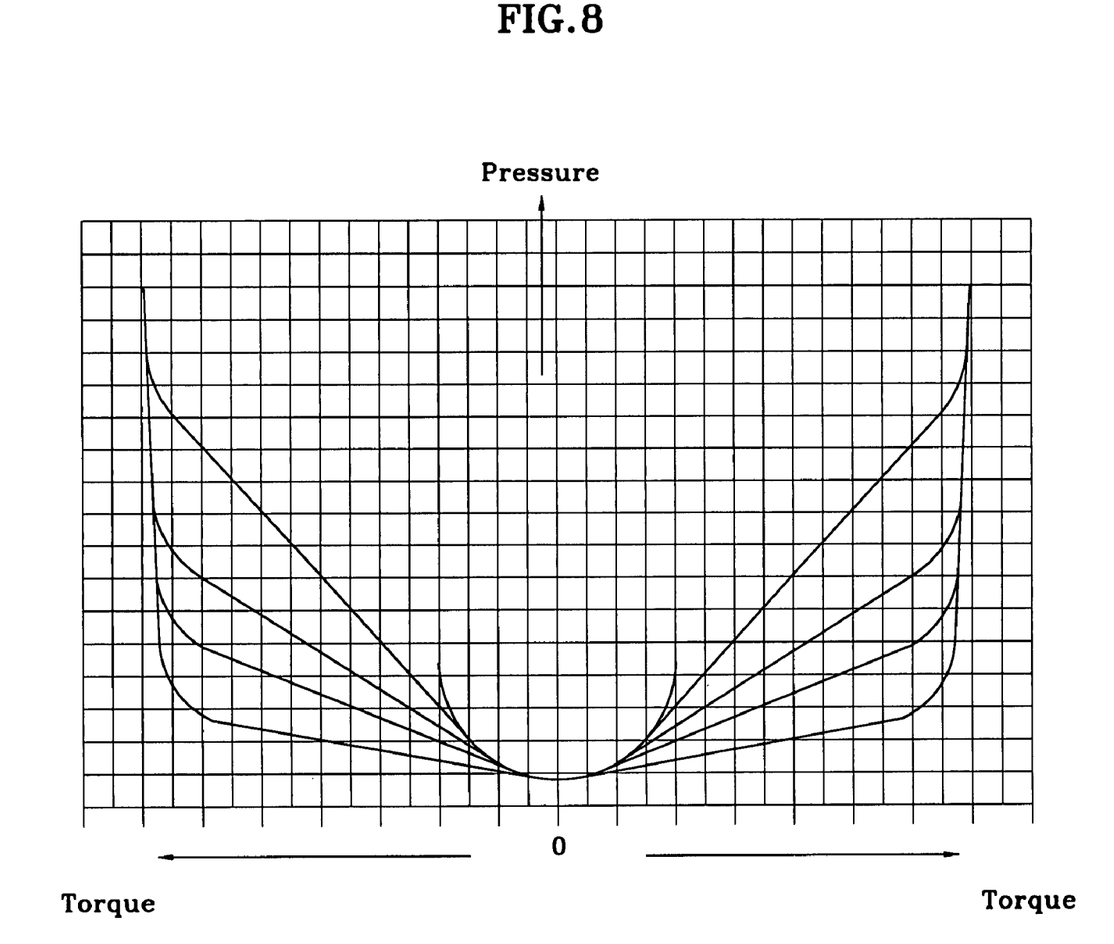
FIG. 8 is a graph illustrating steering force required as related to oil pressure formed by change of diameter in a small-diameter inlet.

By way of reference, FIG. 8 is a graph for illustrating a relation of steering power (torque) necessary for a driver to steer in relation to the hydraulic pressure of the reaction chamber 39 formed by changes in diameter of the small-diameter inlet 53 of the cut-off valve 25. The smaller the incline of the linear section, the larger the diameter of the small-diameter inlet 53. The portion where pressure is abruptly increased from the linear section represents a state of the fluid in the reaction chamber 39 being drained even through the large-diameter inlet 55. Subsequently, features of the power steering system can be also changed by the diameter of the small-diameter inlet 53.

As apparent from the foregoing, there is an advantage in the vehicle speed response type power steering system thus described according to the present invention in that when a vehicle is moving at a relatively slow speed, a relatively large auxiliary power is generated to enable a driver to easily adjust the steering of the vehicle with relatively minimal steering power, and when a vehicle is moving at a high speed, a relatively small auxiliary power is generated to prevent an abrupt turn in order to stabilize the steering operation of the vehicle, such that formation of appropriate auxiliary power in response to a vehicle speed allows a driver to carry out an easy and safe steering manipulation.

What is claimed is:

1. A vehicle speed response type power steering system, comprising:
   connecting means, disposed between a valve sleeve and a valve spool of a control valve, for changing rotational force applied to rotate said valve spool in relation to said valve sleeve in response to a pressure provided to said connecting means;
   a solenoid valve for controlling a flow rate of oil provided from a power steering pump to supply the oil to said connecting means;
   a controller controlling said solenoid valve in response to the vehicle speed;
   a cut-off valve controlling the flow rate of oil returned to an oil reservoir in response to pressure change of oil provided to said connecting means;
   wherein the connecting means comprises:
   an extension ring integrally connected to said valve sleeve;
   a reaction ring installed at a periphery of said valve spool for relative rotation of said reaction ring to be limited in relation to said valve spool and for an axial linear movement of said reaction ring to be enabled in relation to said valve spool;
   a spring and a spring seat disposed to press said reaction ring to a lateral surface of said extension ring;
   two control grooves formed to face each other in between said extension ring and said reaction ring for controlling the relative rotation of said reaction ring against said extension ring;
   a control ball inserted into said control groove; and
   a valve cap facing said reaction ring with a reaction chamber formed between said valve cap and said reaction ring while said spring and said spring seat are formed in said reaction chamber which forms a pressure to be applied to said reaction ring.

2. The system as defined in claim 1, wherein said spring seat is a round plate inserted into a periphery of said valve spool.

3. The system as defined in claim 1, wherein said reaction ring is installed at a periphery of said valve spool by a hitching groove formed axially of said valve spool at an inner circumferential surface of said reaction ring, a fixed groove formed at an axial direction of said valve spool at an outer circumferential surface of said valve spool in order to cooperate with said hitching groove and a fixed ball inserted between said hitching groove and said fixed groove.

4. A system as defined in claim 1, wherein the cut-off valve comprises:

a cut-off body provided with a small-diameter inlet and a large-diameter inlet formed to communicate with said reaction chamber, and an outlet formed to communicate with said oil reservoir; and a cut-off spool and cut-off spring for switching a state of communicating said small-diameter inlet with said outlet to a state of communicating said large-diameter inlet with said outlet as the pressure applied to the large-diameter inlet is increased.

5. A system as defined in claim 4, wherein said outlet, said small-diameter inlet and said large-diameter inlet are formed in a single file in the cut-off body, and said cut-off spool is provided with a conical land having a maximum diameter for communicating said small-diameter inlet with said outlet at all times and formed with the maximum diameter tapering off from said small-diameter inlet to said large-diameter inlet, and an inner circumferential surface between said small-diameter inlet and said large-diameter inlet of said cut-off body is provided with an adjusting end for adjusting a communicating state between said small-diameter inlet and said large-diameter inlet as said conical land is moved.

\* \* \* \* \*